(12) United States Patent  
Thibodeaux et al.

(10) Patent No.: US 9,238,302 B2  
(45) Date of Patent: Jan. 19, 2016

(54) REACHING AID APPARATUS

(71) Applicants: David Allen Thibodeaux, Orange, TX (US); Benjamin David Thibodeaux, La Jolla, CA (US)

(72) Inventors: David Allen Thibodeaux, Orange, TX (US); Benjamin David Thibodeaux, La Jolla, CA (US)

(*) Notice: Subject to any disclaimer, the term of this patent is extended or adjusted under 35 U.S.C. 154(b) by 0 days.

(21) Appl. No.: 14/556,208

(22) Filed: Nov. 30, 2014

(65) Prior Publication Data

US 2015/0151429 A1 Jun. 4, 2015

Related U.S. Application Data

(60) Provisional application No. 61/910,674, filed on Dec. 2, 2013.

(51) Int. Cl.
| | |
|---|---|
| *B25J 1/04* | (2006.01) |
| *B25B 9/00* | (2006.01) |
| *E01H 1/12* | (2006.01) |
| *B25B 7/12* | (2006.01) |

(52) U.S. Cl.  
CPC ... *B25J 1/04* (2013.01); *B25B 7/12* (2013.01); *B25B 9/00* (2013.01); *E01H 1/12* (2013.01)

(58) Field of Classification Search  
CPC .................. B25J 1/02; B25J 1/04; B25J 1/06; B25B 7/12; B25B 9/00; E01H 1/12; A47F 13/06  
USPC .............................. 294/11, 24, 50.9, 104, 209  
See application file for complete search history.

(56) References Cited

U.S. PATENT DOCUMENTS

| | | | | |
|---|---|---|---|---|
| 302,924 | A | | 8/1884 | Mcmillen |
| 322,070 | A | | 7/1885 | Rutan |
| 334,667 | A | * | 1/1886 | Kircher ........................... 294/22 |
| 528,827 | A | | 11/1894 | Thomas |
| 868,094 | A | * | 10/1907 | Jerkins ........................... 294/29 |
| 872,260 | A | * | 11/1907 | Shank ........................... 294/50.9 |
| 914,307 | A | * | 3/1909 | Rhoades ........................ 294/104 |
| 923,376 | A | | 6/1909 | Savage |
| 925,212 | A | | 6/1909 | McConville |
| 958,938 | A | * | 5/1910 | Ott et al. ........................ 294/8.5 |
| 1,501,965 | A | | 7/1924 | Moors |
| 1,718,398 | A | * | 6/1929 | Zaeske ........................... 294/104 |
| 2,575,638 | A | * | 11/1951 | Price ............................. 294/50.9 |
| 2,770,483 | A | * | 11/1956 | Patnaude ..................... 294/50.9 |
| 2,869,914 | A | | 1/1959 | Yoakley |
| 3,093,402 | A | | 6/1963 | Sisson |
| 3,208,786 | A | | 9/1965 | Eddleman |
| 3,425,734 | A | | 2/1969 | Hollis |
| 3,527,492 | A | | 9/1970 | Hollis |
| 3,990,146 | A | * | 11/1976 | Asselta ........................... 30/134 |
| 4,039,216 | A | | 8/1977 | Soos |
| 4,160,563 | A | | 7/1979 | Whitney |
| 4,225,174 | A | | 9/1980 | Hennessy |
| 4,299,419 | A | | 11/1981 | Kalan |
| 4,398,759 | A | | 8/1983 | Manola |
| 4,547,010 | A | | 10/1985 | Camp |
| 4,615,555 | A | | 10/1986 | Bateham |

(Continued)

*Primary Examiner* — Dean Kramer  
(74) *Attorney, Agent, or Firm* — Buche & Associates, P.C.; John K. Buche; Scott D. Compton

(57) ABSTRACT

The present application is directed to a reaching aid apparatus that may be held in a person's hand and grab objects that would otherwise be out of a person's reach. The reaching aid apparatus includes an elongated member with an actuation handle assembly at one end and a grabbing elements assembly at the opposite end for grabbing, lifting and holding objects.

17 Claims, 9 Drawing Sheets

(56) References Cited

U.S. PATENT DOCUMENTS

| | | |
|---|---|---|
| 4,629,234 A | 12/1986 | Sokolowski |
| 4,647,094 A | 3/1987 | Bergkvist |
| 4,669,769 A | 6/1987 | Polder |
| 4,758,035 A | 7/1988 | Shimasaki |
| 4,846,286 A | 7/1989 | McNeely |
| 4,938,516 A | 7/1990 | Temple |
| 5,154,465 A | 10/1992 | Pakosh |
| 5,192,104 A | 3/1993 | Lin |
| 5,317,939 A | 6/1994 | Marinescu |
| 5,380,054 A | 1/1995 | Galvis |
| 5,458,385 A | 10/1995 | Peeples |
| 5,570,919 A | 11/1996 | Eusebe |
| 5,577,785 A | 11/1996 | Traber |
| 5,590,923 A | 1/1997 | Berger |
| 5,857,723 A | 1/1999 | Mathieu |
| 5,881,601 A | 3/1999 | Hammer |
| 5,895,082 A | 4/1999 | Kaluzny |
| 5,941,586 A | 8/1999 | Fann |
| 6,135,520 A * | 10/2000 | Miller et al. .................. 294/1.4 |
| 6,139,077 A | 10/2000 | Molzan, II |
| 6,257,634 B1 | 7/2001 | Wei |
| 6,508,496 B1 | 1/2003 | Huang |
| 6,669,254 B2 | 12/2003 | Thom |
| 6,685,246 B1 * | 2/2004 | Rose ............................. 294/11 |
| 6,739,637 B2 | 5/2004 | Hsu |
| 6,874,833 B2 | 4/2005 | Keith |
| 7,004,520 B2 | 2/2006 | Khubani |
| 7,261,349 B1 | 8/2007 | Gregor |
| 7,344,171 B1 | 3/2008 | McMullan |
| D591,122 S | 4/2009 | Buzby |
| 7,665,782 B2 | 2/2010 | Buzby et al. |
| 7,695,035 B2 * | 4/2010 | Sumner et al. ................. 294/1.4 |
| D617,619 S | 6/2010 | Bensussan |
| 7,980,609 B2 | 7/2011 | Khubani |
| 7,992,901 B2 | 8/2011 | Hirano |
| 8,500,180 B2 | 8/2013 | Buzby |
| 8,529,379 B1 | 9/2013 | Faircloth |
| 8,585,114 B2 | 11/2013 | Kovarik |
| 2003/0020293 A1 | 1/2003 | Hsu |
| 2003/0222467 A1 | 12/2003 | Khubani |
| 2004/0056492 A1 | 3/2004 | Traber |
| 2004/0080169 A1 | 4/2004 | Khubani |
| 2004/0135387 A1 | 7/2004 | Keith |
| 2005/0057055 A1 | 3/2005 | Deal |
| 2006/0221598 A1 | 10/2006 | March |
| 2007/0085358 A1 | 4/2007 | Robinson |
| 2007/0222241 A1 | 9/2007 | Cheng |
| 2008/0224488 A1 | 9/2008 | Khubani |
| 2010/0021279 A1 | 1/2010 | Buzby |
| 2010/0187842 A1 | 7/2010 | Buzby |
| 2010/0263500 A1 | 10/2010 | Bannasch |
| 2012/0261113 A1 | 10/2012 | Langevin |

* cited by examiner

REACHING AID APPARATUS

CROSS-REFERENCE TO RELATED APPLICATIONS

This patent application claims the benefit of provisional patent application Ser. No. 61/910,674 filed on Dec. 2, 2013.

STATEMENT REGARDING FEDERALLY SPONSORED RESEARCH OR DEVELOPMENT

Not applicable.

FIELD OF THE INVENTION

The application relates generally to a hand held reaching aid for grabbing, lifting and holding objects.

BACKGROUND

Hand-operated devices for grabbing and holding objects at a distance are known. Known devices typically include a shaft having a handle on one end, engagement elements on the opposite end, a grab control on the handle and a linkage between the grab control and the engagement elements for drawing the engagement elements together for purposes of grabbing and/or holding an object there between.

Known devices have limitations, namely, their designs are limited to grabbing and/or holding objects of particular sizes, shapes and weights and objects constructed from particular materials. A device that overcomes these limitations is desired.

SUMMARY

The present application is directed to a reaching aid apparatus comprising a main frame; a first handle attached to a first end of the main frame; a first lever pivotally attached to the first handle, the first lever having a first end defining a second handle located on a first side of the main frame; a second lever pivotally attached to the main frame on a second side of the main frame; a linking member pivotally attached at a second end of the first lever and pivotally attached to the second lever; and a biasing member connected to the main frame and the first lever; the second lever and a second end of the main frame providing contact surfaces of the apparatus for grabbing, lifting and holding objects held there between.

The present application is also directed to a reaching aid apparatus comprising a main frame; a first handle attached to a first end of the main frame; a first lever pivotally attached to the first handle, the first lever having a first end defining a second handle; a second lever pivotally attached to the main frame; a linking member having a first end pivotally attached at a second end of the first lever and a second end pivotally attached to the second lever; and a biasing member connected to the main frame and the first lever; the second end of the main frame defining a first contact surface and the second lever defining a second contact surface pivotal from an open position apart from the main frame to a closed position near the main frame, the first and second contact surfaces being operationally configured to grab objects there between.

The present application is also directed to a reaching aid system comprising (A) an apparatus having grabbing elements for securing one or more objects there between, the apparatus including (1) a main frame having a first end and a second end, the second end providing a first grabbing element; (2) a first handle attached to a first end of the main frame; (3) a first lever pivotally attached to the first handle; (4) a second lever pivotally attached to the main frame, the second lever providing a second grabbing element; (5) a linking member pivotally attached to the first lever and pivotally attached to the second lever; and (6) a biasing member connected to the main frame and the first lever; and (B) one or more interchangeable attachment members securable to the main frame and the second lever, the attachment members providing first and second grabbing elements for securing one or more objects there between.

DETAILED DESCRIPTION

Figure 1:
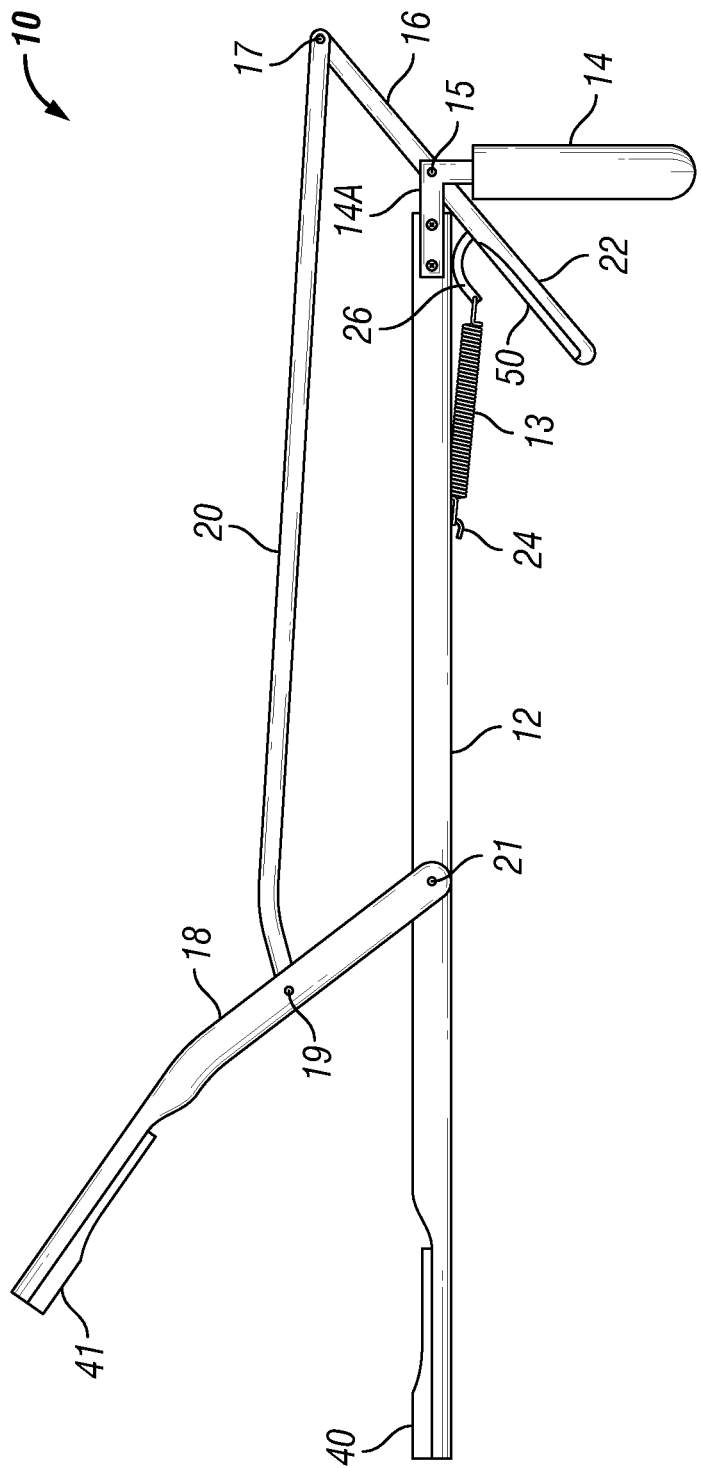
FIG. 1 is a simplified view of an embodiment of a reaching aid apparatus of this application.

Before describing the invention in detail, it is to be understood that the present apparatus, system and method are not limited to particular embodiments. It is also to be understood that the terminology used herein is for the purpose of describing particular embodiments only, and is not intended to be limiting. As used in this specification and the appended claims, the term "grab" in reference to the reaching aid refers to mechanically clutching one or more objects. Terms such as "grasp," "pinch," "seize," "grasp" and "secure" may be used interchangeably with "grab." The term "non-destructive" refers to not altering the condition of an object once contacted by the present apparatus.

In one aspect, the application provides a reaching aid apparatus having interchangeable or swappable attachment members according to the one or more target objects to be grabbed. The use of different types of swappable attachment members may also alter the overall length of the reaching aid apparatus. In addition, the attachment members may be wider than the reaching aid apparatus.

In another aspect, the application provides a reaching aid apparatus for grabbing objects that would otherwise be out of a person's reach.

In another aspect, the application provides a reaching aid apparatus for grabbing and holding objects that a human hand can pick up and hold.

In another aspect, the application provides a reaching aid apparatus for grabbing and lifting objects located at ground level without a user having to bend at the waist to reach the objects.

In another aspect, the application provides a reaching aid apparatus operationally configured to grab and hold objects larger than other known devices.

In another aspect, the application provides a reaching aid apparatus operationally configured to grab and lift objects heavier than other known devices.

In another aspect, the application provides a reaching aid apparatus for an individual that may be operated by one or two hands.

In another aspect, the application provides a reaching aid apparatus with grabbing elements designed for one or more particular uses according to the one or more target objects to be grabbed, lifted and otherwise held by the reaching aid.

In another aspect, the application provides a reaching aid apparatus operationally configured to grab, lift and hold objects ranging in size and/or weight from objects small enough and/or light enough to be held between a person's two fingers to objects of a size and/or weight typically requiring two hands to pick up.

In another aspect, the application provides a reaching aid apparatus operationally configured to grab, lift and hold anything that may be grabbed, lifted and held by the human hand, e.g., eye glasses, coins, wood logs, tools, fallen leaves, food items, etc.

In another aspect, the application provides a reaching aid apparatus that may be used by both right-handed and left-handed persons.

In another aspect, the application provides a reaching aid apparatus that may be hung on a wall or stored along a similar surface during nonuse.

In another aspect, the application provides a reaching aid apparatus suitable for use after natural disasters and the like.

In another aspect, the application provides a reaching aid apparatus that may built to scale.

Figure 2:
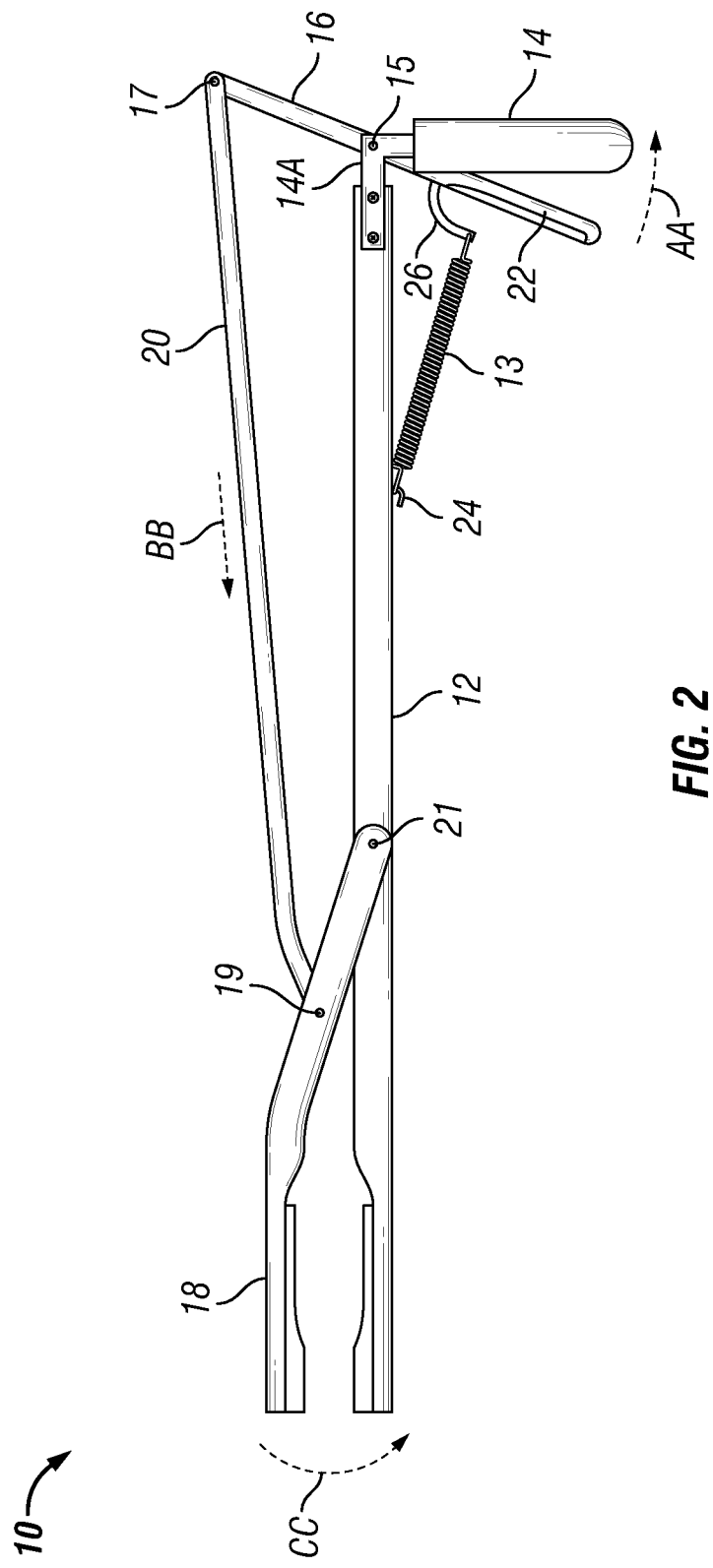
FIG. 2 is another simplified view of the reaching aid apparatus of FIG. 1.

With reference to FIGS. 1 and 2, an exemplary reaching aid apparatus 10 is provided. In simplest terms, the reaching aid apparatus 10 (hereafter "apparatus") includes an elongated member with an actuation handle assembly at one end and a grabbing elements assembly at the opposite end for grabbing, lifting and holding objects. According to the configuration of component parts, the apparatus 10 is operationally configured to grab and/or lift and/or hold one or more objects totaling a weight about ten times the weight of the apparatus 10.

As shown, the apparatus 10 includes a main frame 12 defined by a first end and a second end, a first handle 14 attached to the first end of the main frame 12 in a fixed position, a first lever 16 pivotally attached to the first handle 14, a second lever 18 pivotally attached to the main frame 12 and a linking member 20 pivotally attached to the first and second levers 16, 18 and interconnecting the same. As discussed below, the second lever 18 and the second end of the main frame 12 operate as grabbing members of the apparatus 10. In basic operation, the first lever 16 may be directed toward the first handle 14, which directs the second lever 18 toward the main frame 12 via the linking member 20, the second lever 18 and the second end of the main frame 12 operationally configured to act as grabbing elements in a jaw like manner for grabbing, lifting and holding objects held there between. In particular, the second end of the main frame 12 operates as a stationary grabbing element and the second lever 18 operates as a movable grabbing element.

The main frame 12 may be provided as a solid member or a hollow member. For example, the main frame 12 may be provided as a solid cylindrical or a hollow tubular member with a longitudinal axis as shown in FIG. 1. In another embodiment, the main frame 12 may be oval shaped. In another embodiment, the main frame 12 may be multi-sided.

In another embodiment, the main frame 12 may be provided in a non-linear configuration, e.g., a bow shape. In addition, the main frame 12 may include a hinge for folding the main frame 12 during disassembly and storage of the apparatus 10. In another embodiment, the main frame 12 may comprise an assembly of individual component parts for assembly and disassembly. The main frame 12 may also be provided as a telescopic member.

The first handle 14 may include a one piece configuration or an assembly of parts as shown including a handle bracket member 14A or members attachable to the main frame 12. As shown, the first handle 14 may include an L-shape. In another embodiment, the first handle 14 may be straight and attachable or mateable to the main frame 12. In another embodiment, the first handle 14 may be curved or otherwise non-linear and attachable or mateable to the main frame 12.

As depicted in FIGS. 1 and 2, the first lever 16 is suitably provided as an elongated member pivotally coupled to the handle bracket member 14A (hereafter "bracket") at a first pivot point 15 with first and second distal ends on opposite sides of the main frame 12. Suitably, the first end of the first lever 16 provides a second gripping handle 22 of the apparatus 10 pivotal about the bracket 14 according to directional arrow AA and is effective for applying an input force. The second end of the first lever 16 is suitably pivotally attached to a first end of the linking member 20 at a second pivot point 17 and is effective for applying an output force. The length of the first and second ends of the first lever 16 may be adjusted as desired.

The second end of the linking member 20 is pivotally coupled to the second lever 18 at a third pivot point 19. A first end of the second lever 18 is pivotally coupled to the main frame 12 at a fourth pivot point 21. The length of the linking member 20 and/or the second lever 18, and the pivot points, may be adjusted as desired. In one embodiment, the linking member 20 may be substantially linear. As shown in FIG. 1, the linking member 20 may include a non-linear configuration. Without limiting the invention, in one embodiment the width of the second lever 18 is substantially similar as the width of the second end of the main frame 12.

The apparatus 10 may also include a biasing member 13 operationally configured to provide a biasing force to the second handle 22 in a manner effective to maintain the second handle 22, and the apparatus 10, in an open position as shown in FIG. 1. Without limiting the invention a suitable biasing member 13 may include, but is not necessarily limited to a coiled spring, a resilient band such as a bungee cord or like item, and a gas spring strut for directing the second handle 22 to an open position.

In operation, are individual may use one or two hands to squeeze the second handle 22 toward the first handle 14 overcoming the biasing force of the biasing member 13. As such, in one embodiment the biasing member 13 may include a biasing force sufficient to child proof the apparatus 10. Also, for ease of use, the first handle 14 and/or the second handle 22 may be provided with outer gripping surfaces and/or cushion type surfaces as is common to various hand tools, e.g., see the finger grip surface 50 of the second handle 22 as shown in FIG. 3.

Referring to FIG. 2, when squeezed the second handle 22 is drawn toward the first handle 14 (see directional arrow AA) to a closed position in a manner effective to act on the linking member 20 (see directional arrow BB) to direct a second end of the second lever 18 toward the main frame 12 (see directional arrow CC) to a closed position of the apparatus 10. From this closed position, the first lever 16 is operationally configured to draw the second end of the second lever 18 apart from the main frame 12 to an open position, i.e., an open mouth position, of the apparatus 10.

In this embodiment, the biasing member 13 includes a coiled spring attached to the main frame 12 at a first end and to the first lever 16 at a second end. More particularly, the main frame 12 suitably includes a fastening element 24 for receiving the first end in releasable attachment thereto. Likewise, the first lever 16 suitably includes an attachment member 26 for receiving the second end of the biasing member 13 in releasable attachment thereto. Although the attachment member 26 may include any configuration or fastening type as desired, the attachment member 26 of FIGS. 1 and 2 includes a curved appendage operationally configured to provide clearance for a person's hand for gripping the second handle 22 unencumbered. In one embodiment, the attachment member 26 may be a separate component part attachable to the first lever 16. In another embodiment, the attachment member 26 may be substantially straight. In another embodiment, the first lever 16 may be constructed to necessarily including an attachment member 26 as part of its original form.

Figure 3:
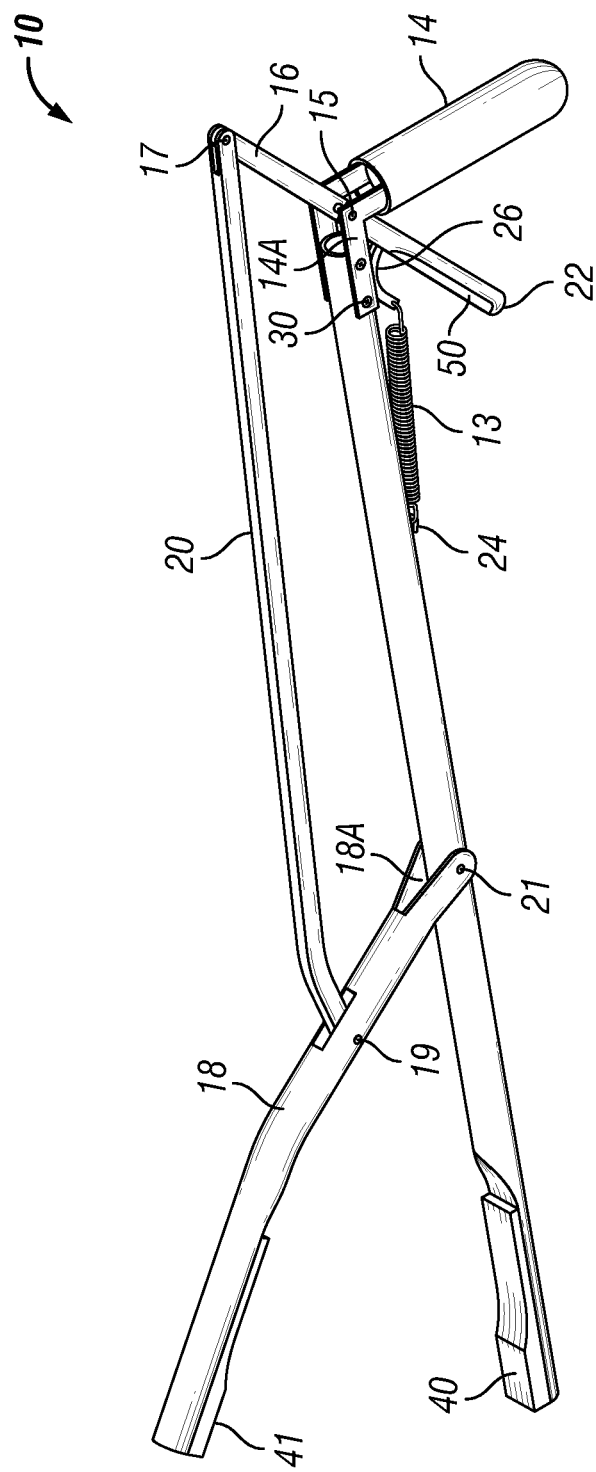
FIG. 3 is a simplified perspective view of the reaching aid apparatus of FIG. 1.
Figure 5:
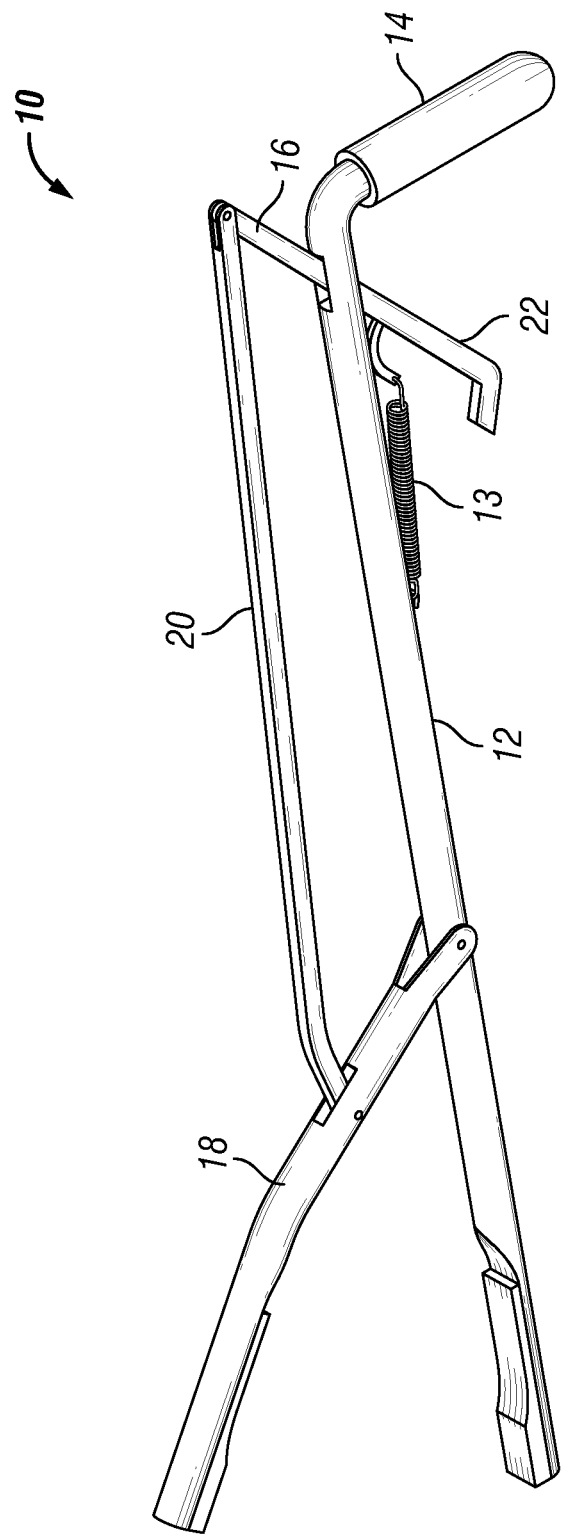
FIG. 5 is a simplified perspective view of another reaching aid apparatus of this application.

Turning to FIG. 3, the bracket 14A may include a one piece configuration or bracket assembly with brackets disposed along opposite sides of the first end of the main frame 12 providing a pivot point 15 for a first lever 16 disposed there between. As shown, the brackets 14A may include L-brackets attached to the main frame 12 via fasteners 30. Suitably, the pivot point 15 includes a pivot pin attached to the L-brackets and disposed through an aperture of the first lever 16 allowing the first lever 16 to pivot about the pivot pin. In another embodiment, the main frame 12 may include a curved first end for forming a first handle 14 (see FIG. 5). In such embodiment, the main frame 12 may include an opening providing a pivot point 15 and clearance for a first lever 16 disposed there through.

As further shown in FIG. 3, the first end of the second lever 18 may include forks 18A for pivotal attachment of the second lever 18 with the main frame 12 via a pivot pin disposed through an aperture in the main frame 12. One or more pivot pins may be fixed to their corresponding component parts, e.g., via welds, adhesives, and/or one or more pivot pins may be separate parts connectable to their corresponding component parts.

Figure 4:
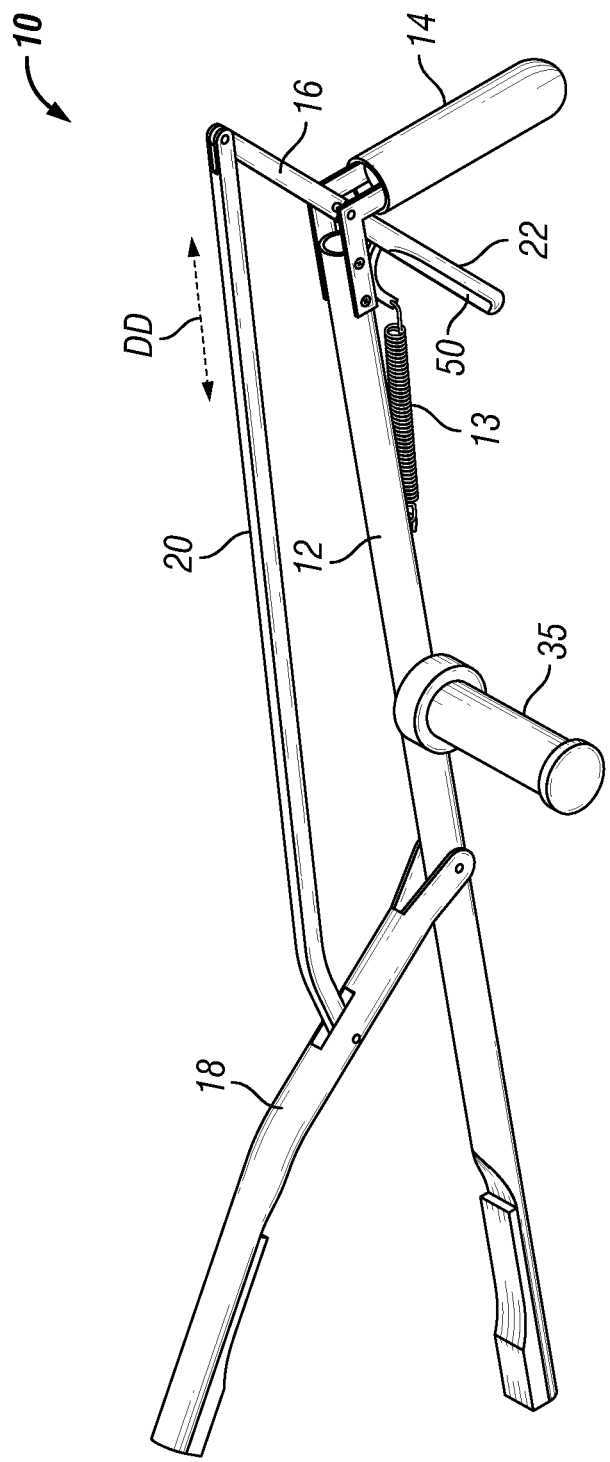
FIG. 4 is a simplified perspective view of another reaching aid apparatus of this application.

In another embodiment, the apparatus 10 may also include a third handle 35 attached to the main frame 12 to assist a person in holding and/or guiding the apparatus 10 with two hands. In the embodiment of FIG. 4, the third handle 35 extends out from the left side of the main frame 12 suitable for left hand use. In another embodiment, the third handle 35 may extend out from the right side of the main frame 12 in a manner effective to be held by a person's right hand. In another embodiment, the apparatus 10 may be operationally configured to receive a third handle 35 on either side of the main frame 12 for interchangeability as desired. For example, the main frame 12 may include female type threads for receiving male type threads of the third handle 35 or vice versa. In another embodiment, the apparatus 10 may include third and fourth handles attached to the main frame 12 for right and left handed use as desired. In still another embodiment, a third handle 35 may be attached to the linking member 20 for holding the apparatus 10 and/or for directing the linking member 20 back and forth (see directional arrow DD). In such embodiment, the ability to direct the second lever 18 to a closed position may be accomplished via a third handle 35 attached to the linking member 20 rather than by squeezing the second handle 22 toward the first handle 14. In such embodiment, the apparatus 10 may be provided without a second handle 22. It is further contemplated that other elements may be employed in order for a person to operate the apparatus 10 with two hands. For example, the apparatus 10 may be provided with a chain, strap, rope or other offshoot that may be hand held. Likewise, in another embodiment the first handle 14 may be provided at a length effective to be held by both hands.

Figure 6:
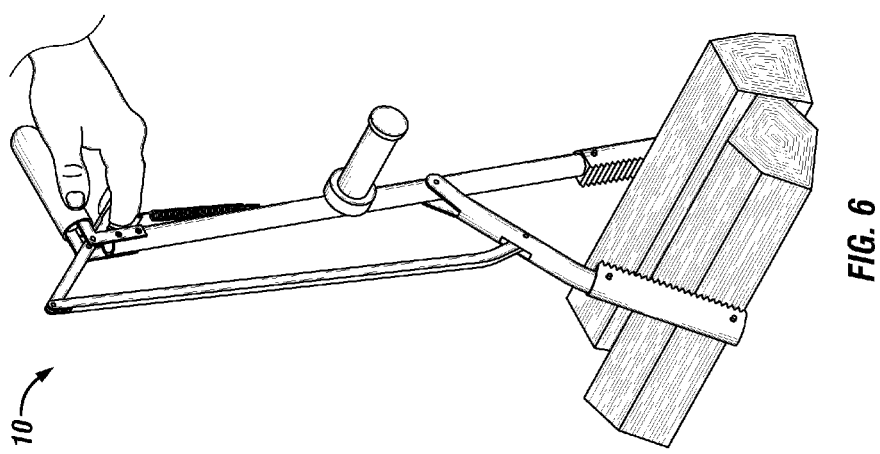
FIG. 6 is a simplified illustration of a reaching aid apparatus of this application holding a tree log.

As stated above, the apparatus 10 includes grabbing elements for grabbing, lifting and holding objects there between. Suitably, the second end of the main frame 12 may include a grabbing element 40 providing a first contact surface and the second end of the second lever 18 may include a grabbing element 41 providing a second contact surface for grabbing, lifting and holding objects there between. Suitably, the grabbing elements may comprise one or more component parts attachable to the main frame 12 and the second lever 18 effective for providing contact surfaces for grabbing, lifting and holding one or more particular objects. For example, the grabbing elements 40, 41 may include substantially flat or smooth surfaces. In another embodiment, the grabbing elements 40, 41 may include irregular surfaces. In one embodiment, the grabbing elements 40, 41 may be constructed from one or more materials and include surface configurations effective for the non-destructive grabbing, lifting and holding of particular objects. In another embodiment, the grabbing elements 40, 41 may be constructed from one or more materials providing penetrating, biting or cutting type surfaces for puncturing and/or cleaving onto particular objects. In another embodiment, the grabbing elements 40, 41 may be constructed from one or more materials and include surface configurations allowing a person to grab, lift and hold a greater amount of one or more materials than the same person can grab, lift and hold with his/her two hands. For example, the grabbing elements 40, 41 may be constructed from one or more resilient materials for grabbing, lifting and holding objects such as cement blocks and metal pipe in a non-destructive manner. In another embodiment, the grabbing elements 40, 41 may include serrations or teeth for grabbing, lifting and holding pieces of wood (see FIG. 6). The grabbing elements 40, 41 may also include expanded or fanned configurations for increasing the surface area of the grabbing elements for grabbing and lifting materials including, but not necessarily limited to leaves, snow, garbage, sand, dirt, Styrofoam packing peanuts or popcorn, and other small loose items.

As shown in FIGS. 1-3, the grabbing elements 40, 41 may include raised surfaces at the distal ends for minimizing the distance between the grabbing elements 40, 41 when the apparatus 10 is in a closed position (see FIG. 2). Regardless the shape, suitable grabbing elements 40, 41 are constructed from one or more materials durable for use over time. For example, the grabbing elements 40, 41 as depicted in FIGS. 1-3 may be constructed from materials including, but not necessarily limited to rubbers, stone, plastics, woods, metals, composite materials, and combinations thereof. In one embodiment, the grabbing elements 40, 41 of FIGS. 1-3 may be constructed from rubber of about 40 to about 100 durometer. In one particular embodiment, the grabbing elements 40, 41 may be constructed from black styrene-butadiene rubber (SBR). In another particular embodiment, the grabbing elements 40, 41 may be constructed from one or more thermoplastic polymers including, but not necessarily limited to polypropylene. In another embodiment, the grabbing elements 40, 41 may be constructed from foam rubber. In still another embodiment, the grabbing elements 40, 41 may be constructed from one or more materials described above having an outer rubber coating or foam rubber coating or a rubber or foam rubber contact surface of the grabbing elements.

Grabbing elements 40, 41 as described above may be attached to the main frame 12 and second lever 18 via fasteners such as screws and the like. The grabbing elements 40, 41 may also be adhered to the main frame 12 and second lever 18. In another embodiment, the main frame 12 and second lever 18 may be operationally configured to receive the grabbing elements 40, 41 in a slip-on manner. In another embodiment, the grabbing elements 40, 41 may be clamped to the main frame 12 and second lever 18. Also, the grabbing elements 40, 41 may include widths substantially similar as the width of the main frame 12 and second lever 18. In other embodiments, the grabbing elements 40, 41 may include widths greater than or less than the width of the main frame 12 and second lever 18.

In an embodiment including serrated grabbing elements 40, 41, the grabbing elements 40, 41 are suitably constructed from one or more materials effective for penetrating, biting, cutting, puncturing, and/or cleaving one or more particular objects including, but not necessarily limited to woods, paper, open-cell and closed cell foam products, rubbers, plastics, textiles, leather, construction insulation materials, and combinations thereof. In such embodiment, suitable grabbing elements 40, 41 materials may include, but are not necessarily limited to metals, plastics, woods, rubbers, composite materials, stone, and combinations thereof. In one exemplary embodiment, the grabbing elements 40, 41 may be constructed from aluminum. In another embodiment, the grabbing elements 40, 41 may be constructed from stainless steel. In another embodiment, the grabbing elements 40, 41 may be constructed from titanium. In another embodiment, the grabbing elements 40, 41 may be constructed from one or more thermoplastic polymers including, but not necessarily limited to polypropylene.

Figure 7:
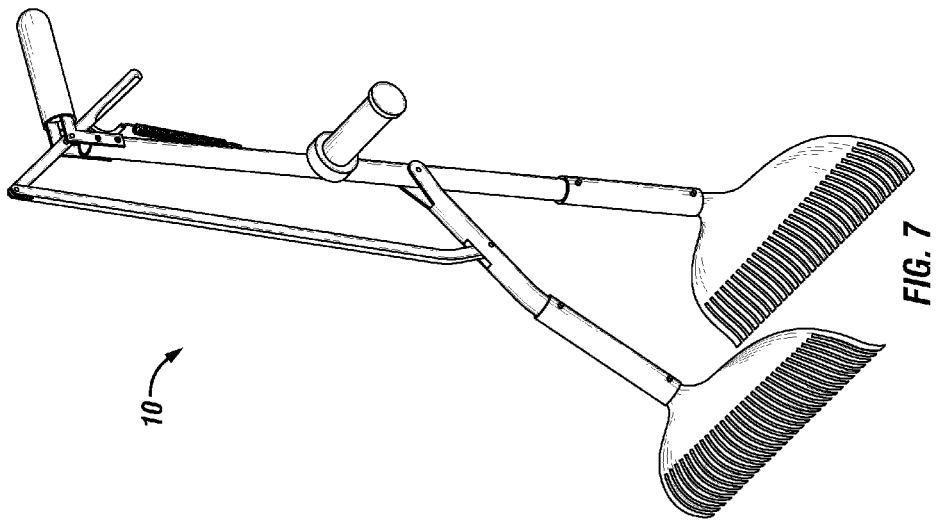
FIG. 7 is a simplified view of another embodiment of a reaching aid apparatus of this application.
Figure 9:
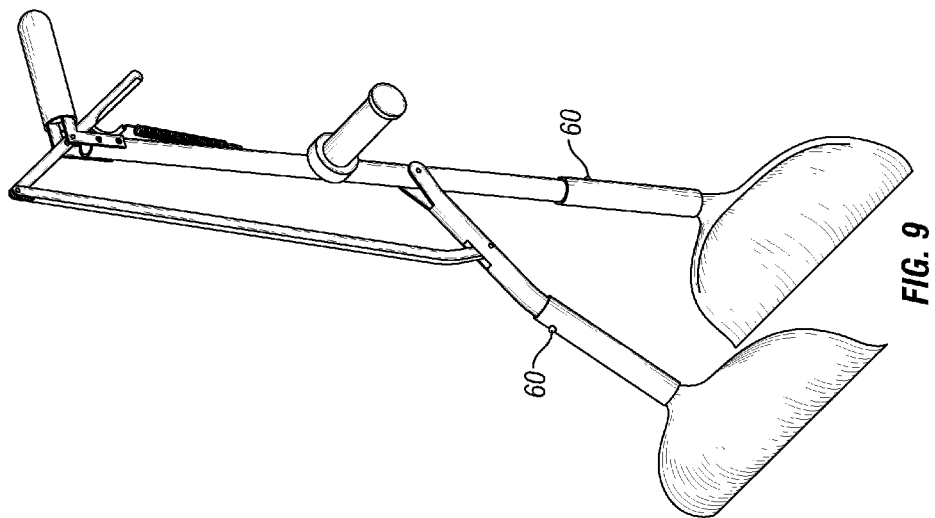
FIG. 9 is a simplified view of another embodiment of a reaching aid apparatus of this application.
Figure 8:
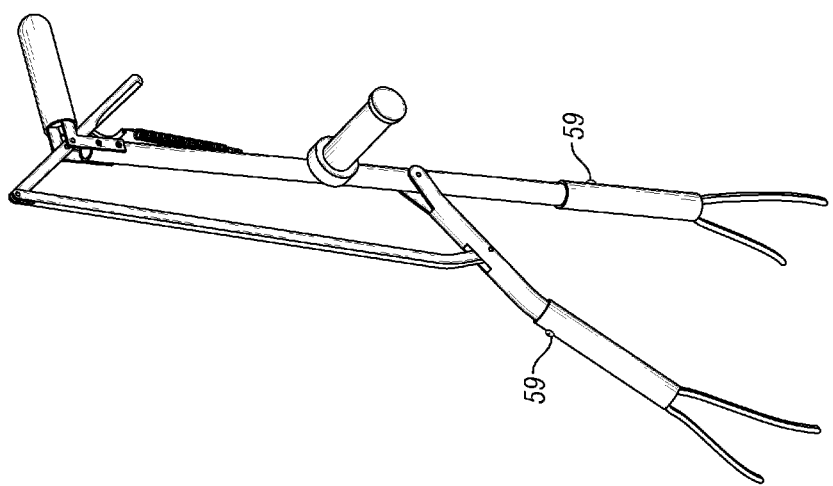
FIG. 8 is a simplified view of another embodiment of a reaching aid apparatus of this application.

In another embodiment, the grabbing elements 40, 41 may include one or more interchangeable attachment members releasably securable to the main frame 12 and the second lever 18. The attachment members are not limited to any particular configuration or type but may be designed according to one or more tasks or uses of the apparatus 10. In addition, the attachment members may be constructed from various materials including, but not necessarily limited to metals, plastics, rubbers, woods, stone, composite materials, and combinations thereof as desired or otherwise required. For example, the grabbing elements 40, 41 may include plastic rake members (see FIG. 7) attachable to the main frame 12 and the second lever 18. The grabbing elements 40, 41 may also include a plurality of metal finger elements as shown in FIG. 8. The finger elements may be provided as static members or one or more finger elements may flex, pivot or otherwise be displaceable for form fitting an object being grabbed. In another embodiment, the grabbing elements 40, 41 may include plastic or metal shovel type members (see FIG. 9). In another embodiment, the grabbing elements 40, 41 may include one or more magnets for attaching to, lifting and holding one or more objects. In another embodiment, the grabbing elements 40, 41 may include adhesive or tacky type surfaces for attaching to, lifting and holding one or more objects. In another embodiment, one or more of the grabbing elements 40, 41 may include spike type members for puncturing through, lifting and holding objects, e.g., collecting trash lying on the side of a road. In another embodiment, the grabbing elements 40, 41 may include suction cups to assist in grabbing, lifting and holding one or more particular objects. It is further contemplated that dissimilar attachment members may be employed as grabbing elements 40, 41 as desired or otherwise required for one or more particular operations. In addition, the attachment members may be releasably attached to the main frame 12 and second lever 18 as desired. For example, the attachment members may include slip-on fits, e.g., female slip-on members as shown in FIG. 7. In another embodiment, the attachment members may be secured to the main frame 12 and second lever 18 via one or more fasteners 59 such as the set screw shown in FIG. 8. In another embodiment, the attachment members may be secured to the main frame 12 and second lever 18 via a spring button set pin 60 or the like. Other modes of attaching the attachment members to the main frame 12 and second lever 18 may include, but are not necessarily limited to threaded attachments, magnets, tape, latches, hook and loop fasteners, socket locks, and combinations thereof. In addition, the ends of the main frame 12 and the second lever 18 may be keyed or grooved to prevent undesired turning of the attachment members about the main frame 12 and second lever 18.

As shown in the Figures, the present apparatus 10 includes various levers and various pivot points effective for providing load bearing features not found in other hand-operated devices. In particular, the length of the levers 16, 18, the length and/or shape of the linking member 20 and the location of the pivot points are operationally configured to provide an adult person the ability to squeeze the second handle 22 with a normal input force for such devices and increase the output force applied to the object to be grabbed. Likewise, when the apparatus 10 is oriented downward, an object may be held securely within the grabbing elements 40, 41 and suspended in space without the necessity of squeezing the second handle 22. In other words, a person may simply suspend the second handle 22 atop his/her hand whereby gravity forces the second handle 22 toward the first handle 14, which directs the second lever 18 toward the second end of the main frame 12 for securing an object between the grabbing elements 40, 41.

In one embodiment as shown in FIG. 1, the first lever 16 suitably includes a length about thirty percent the length of the apparatus 10. In this embodiment, the first lever 16 is pivotally attached at the first pivot point 15 at about its midpoint. In addition, the length of the second lever 18 is about forty-seven percent the length of the apparatus 10. In addition, the length of the linking member 20 suitably includes a length about seventy-two percent the length of the apparatus 10. In addition, the length of the second end of the first lever 16 is about thirty-three percent the length of the second lever 18. The length of the first lever 16 is about forty-two percent the length of the linking member 20.

Figure 10:
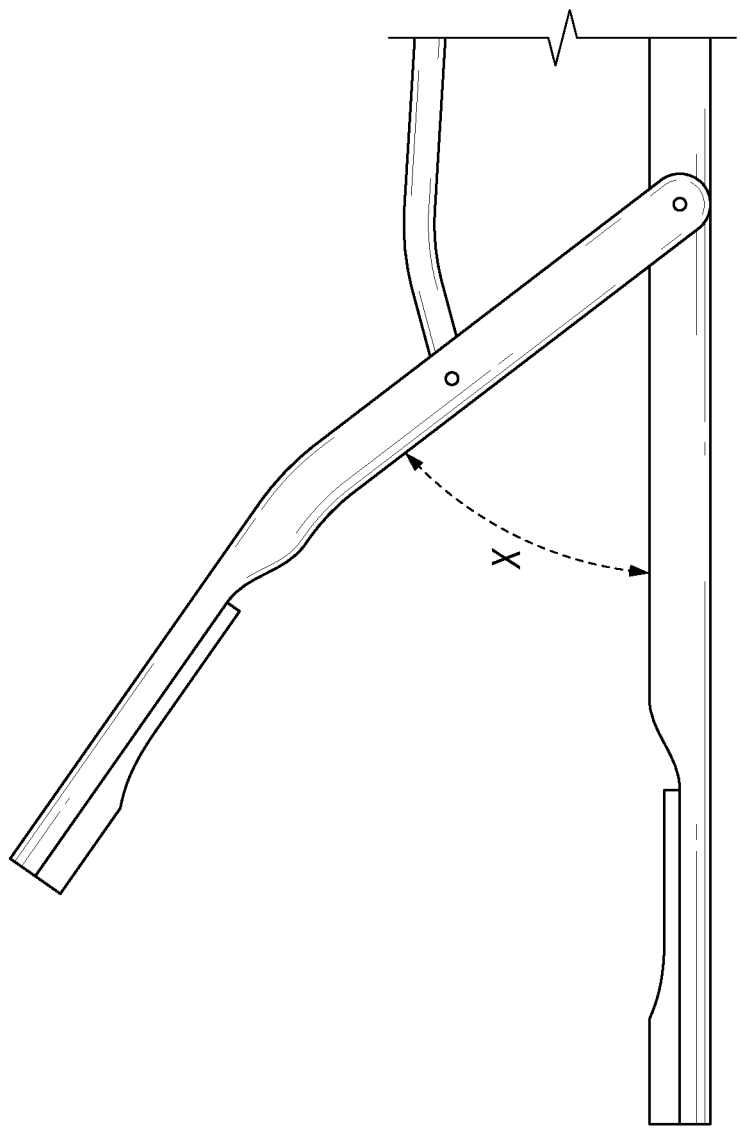
FIG. 10 is a partial view of grabbing members of an embodiment of the reaching aid apparatus of this application.

In one embodiment, the fourth pivot point 21 is located along the main frame 12 at a point so that the distal end of the second lever 18 terminates at about the same distance from the first end of the main frame 12 as does the second end of the main frame 12 (see FIG. 2). Suitably, the length of the levers 16, 18, the length of the linking member 20 and the location of the pivot points are effective to open the second lever 18 and form an angle X with the main frame 12 up to about 52.0 degrees when the apparatus 10 is in an open position (see FIG. 10). In an embodiment including a curved or bent second lever 18 as shown in FIG. 1, the distance between the distal ends of the main frame 12 and the second lever 18 in an open position of the apparatus 10 is about thirty percent the length of the apparatus 10. The shape of the second lever 18, the main frame 12 and the length of the main frame 12, first lever 16, second lever 18 and the linking member 20 and the pivot points there between may vary as desired or otherwise required, in order to alter (1) the distance between the distal ends of the main frame 12 and the second lever 18 in an open position and/or (2) angle X.

The apparatus 10 may also be provided with one or more accessory members for assisting a user with operation of the apparatus 10. Exemplary accessory members may include, but are not necessarily limited to a sleeve, shroud or other enclosure for covering the biasing member 13, one or more adjustment straps for securing the apparatus 10 to a person's hand, wrist or forearm, one or more shoulder straps, a hook for attachment to a person's belt, and combinations thereof.

The apparatus 10 is suitably constructed from one or more materials strong enough to maintain its basic shape during operation. In particular, the apparatus 10 may be constructed of one or more materials including but not necessarily limited to those materials resistant to chipping, cracking, excessive bending and reshaping as a result of ozone, weathering, heat, moisture, other outside mechanical and chemical influences, as well as various impacts and other loads placed on the apparatus 10. Likewise, the apparatus 10 may comprise any color or combination of colors depending on individual preferences and needs. In addition, the apparatus 10 may include layers of various materials, e.g., metal component parts with an outer rubber coating. The apparatus 10 may also be provided as an insulated hand held apparatus constructed from materials similar as other insulated hand tools.

Suitable apparatus 10 materials include but are not necessarily limited to metals, plastics, rubbers, woods, filled composite materials, and combinations thereof. Suitable plastics include, but are not necessarily limited to thermoplastic polymers, for example, acrylonitrile butadiene styrene (ABS), polyvinyl chloride (PVC), polyamide (Nylon), polymethyl methacrylate (Acrylic), polypropylene, polystyrene, low density polythene (LDPE), high density polythene (HDPE). Suitably metals include, but are not necessarily limited to aluminum, titanium, metal alloy, steel, and combinations thereof.

One exemplary main frame 12 may be constructed from stainless steel. Another exemplary main frame 12 may be constructed from aluminum tubing. Suitably, the first handle 14 is constructed from one or more materials strong or rigid enough to support the apparatus 10 and the first lever 16 at pivot point 15. An exemplary first handle 14 may be constructed from stainless steel. Another exemplary first handle 14 may be constructed from molded aluminum. The first lever 16 is also suitably constructed from or more strong or rigid materials for operating as a lever about pivot points 15 and 17. An exemplary first lever 16 may be constructed from stainless steel. Another exemplary first lever 16 may be constructed from molded aluminum. Although the second lever 18 may be constructed from one or more materials suitable for grabbing operation of the apparatus 10, a suitable second lever 18 is constructed from like materials as the main frame 12 that is strong or rigid enough to provide pivot point 19.

The invention will be better understood with reference to the following non-limiting examples, which are illustrative only and not intended to limit the present invention to a particular embodiment.

EXAMPLE 1

Figure 11:
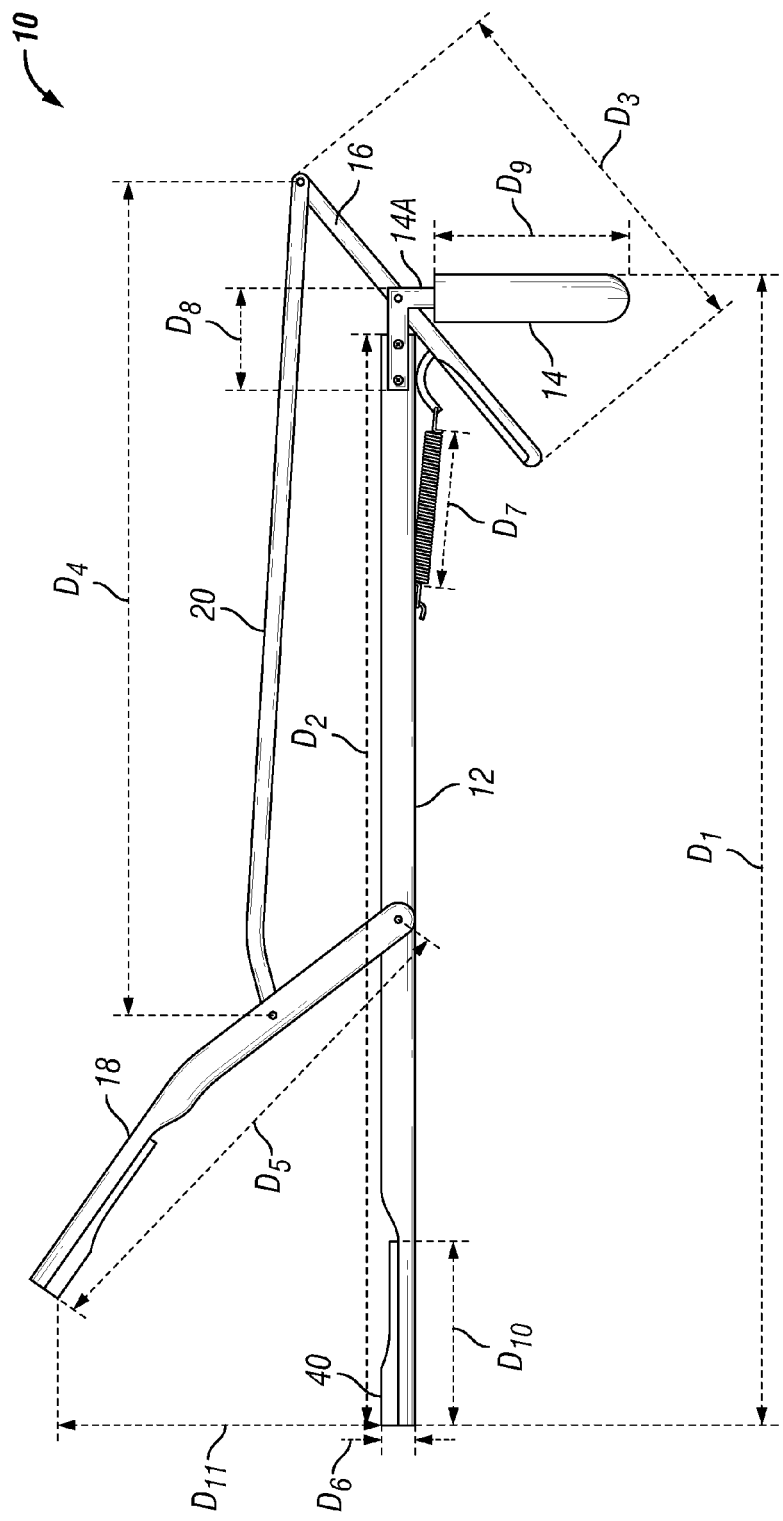
FIG. 11 is a simplified view of an embodiment of a reaching aid apparatus of this application.

In a first non-limiting example, an apparatus 10 as illustrated in FIG. 11 is provided according to the following parameters:
- D1: about 85.4 cm (about 33.63 inches)
- D2: about 83.5 cm (about 32.88 inches)
- D3: about 26.0 cm (about 10.25 inches)
- D4: about 61.6 cm (about 24.25 inches)
- D5: about 39.9 cm (about 15.69 inches)
- D6 about 1.9 cm (about 0.75 inches)
- D7: about 15.2 cm (about 6.0 inches)
- D8: about 6.4 cm (about 2.50 inches)
- D9: about 13.5 cm (about 5.31 inches)
- D10: about 15.2 cm (about 6.0 inches)
- D11: about 25.4 cm (about 10.0 inches)

EXAMPLE 2

In a second non-limiting example, an apparatus 10 as described in Example 1 and constructed from aluminum with rubber grabbing elements 40, 41 is provided. The apparatus 10 was placed on a Hanson™ utility scale and measured, the weight of the apparatus 10 being about 1.25 kilograms (about 2.75 pounds). The apparatus 10 was used to pick up a cement block from the ground at a first location and carry the cement block for deposit at a second location. Once moved, the cement block was measured using a standard tape measure and weighed using the Hanson™ utility scale. The cement block had the following dimensions:
Length: about 39.7 cm (about 15.63 inches)
Width: about 19.4 cm (about 7.63 inches)
Height: about 19.4 cm (about 7.63 inches).
The cement block weighed about 12.47 kilograms (about 27.5 pounds).

The apparatus 10 was effective for lifting and carrying about ten times its own weight.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

We claim:

1. A reaching aid apparatus comprising:
   a main frame;
   a first handle including L-shape brackets attached to a first end of the main frame;
   a first lever disposed between the brackets and pivotally attached thereto, the first lever having a first end defining a second handle, the first end of the first lever being located on a first side of the main frame;
   a second lever pivotally attached to the main frame and extending out from a second side of the main frame opposite said first side of the main frame;
   a linking member located on the second side of the main frame and pivotally attached at a second end of the first lever and pivotally attached to the second lever; and
   a biasing member connected to the main frame and the first lever;
   the second lever and a second end of the main frame providing contact surfaces of the apparatus for grabbing, lifting and holding objects held there between.

2. The reaching aid apparatus of claim 1 including brackets attached to opposite sides of the first end of the main frame.

3. The reaching aid apparatus of claim 1 wherein the linking member includes a non-linear configuration.

4. The reaching aid apparatus of claim 1 wherein the first lever includes an attachment member for receiving the biasing member in releasable attachment thereto.

5. The reaching aid apparatus of claim 1 wherein the second lever and the second end of the main frame include grabbing elements attached thereto.

6. The reaching aid apparatus of claim 5 wherein the grabbing elements include serrations.

7. The reaching aid apparatus of claim 1 wherein the biasing member is a coiled spring.

8. The reaching aid apparatus of claim 1 wherein the second handle includes an outer gripping surface.

9. The reaching aid apparatus of claim 1 wherein the first lever includes a length about thirty percent the length of the reaching aid apparatus.

10. The reaching aid apparatus of claim 1 further including a third handle attached to the main frame.

11. A reaching aid apparatus comprising:
a main frame;
a first handle including L-shape brackets attached to a first end of the main frame;
a first lever disposed between the brackets and pivotally attached thereto, the first lever having a first end terminating on a first side of the main frame and a second end terminating on an opposite second side of the main frame, the first end of the first lever defining a second handle;
a second lever pivotally attached to the main frame and extending out from the second side of the main frame;
a linking member having a first end pivotally attached at the second end of the first lever and a second end pivotally attached to the second lever; and
a biasing member connected to the main frame and the first lever;
the second end of the main frame defining a first contact surface and the second lever defining a second contact surface pivotal from an open position apart from the main frame to a closed position near the main frame, the first and second contact surfaces being operationally configured to grab objects there between.

12. The reaching aid apparatus of claim 11 wherein the first lever includes a length about forty-two percent the length of the linking member.

13. The reaching aid apparatus of claim 11 wherein the distance between the second end of the main frame and a distal end of the second lever in said open position is about thirty percent the length of the reaching aid apparatus.

14. The reaching aid apparatus of claim 11 wherein the second end of the main frame and the second lever are operationally configured to receive one or more interchangeable attachment members in attachment thereto.

15. The reaching aid apparatus of claim 11 wherein the reaching aid apparatus is operationally configured to grab, lift and hold one or more objects totaling a weight about ten times the weight of the reaching aid apparatus.

16. A reaching aid system comprising:
an apparatus having grabbing elements for securing one or more objects there between, the apparatus including (1) a main frame having a first end and a second end, the second end providing a first grabbing element; (2) a first handle including L-shape brackets attached to a first end of the main frame, the first handle extending out from the main frame on a first side of the main frame; (3) a first lever disposed between the brackets of the first handle and pivotally attached to the brackets; (4) a second lever pivotally attached to the main frame and extending out from a second side of the main frame opposite said first side, the second lever providing a second grabbing element; (5) a linking member on said second side of the main frame, the linking member being pivotally attached to the first lever and pivotally attached to the second lever; and (6) a biasing member connected to the main frame and the first lever; and
one or more interchangeable attachment members securable to the main frame and the second lever, the attachment members providing first and second grabbing elements for securing one or more objects there between.

17. The system of claim 16 wherein the second end of the main frame and the second lever are operationally configured to receive the one or more interchangeable attachment members in slip-on attachment.

* * * * *